United States Patent [19]

Spence et al.

[11] Patent Number: 5,554,690

[45] Date of Patent: *Sep. 10, 1996

[54] LOW VISCOSITY ADHESIVE COMPOSITIONS CONTAINING ASYMMETRIC RADIAL POLYMERS

[75] Inventors: Bridget A. Spence; Jeffrey G. Southwick; Steven S. Chin, all of Houston, Tex.

[73] Assignee: Shell Oil Company, Houston, Tex.

[*] Notice: The term of this patent shall not extend beyond the expiration date of Pat. No. 5,550,196.

[21] Appl. No.: 489,529

[22] Filed: Jun. 12, 1995

Related U.S. Application Data

[62] Division of Ser. No. 336,458, Nov. 9, 1994.

[51] Int. Cl.⁶ .................................................. C08F 297/04
[52] U.S. Cl. ............................................. 525/105; 525/314
[58] Field of Search ................................ 525/314; 11/105

[56] References Cited

U.S. PATENT DOCUMENTS

| | | |
|---|---|---|
| 3,150,209 | 9/1964 | Short et al. . |
| 3,244,664 | 4/1966 | Zelinkski et al. . |
| 3,281,393 | 10/1966 | Zelinski et al. . |
| 3,496,154 | 2/1970 | Wofford . |
| 3,498,960 | 3/1970 | Wofford . |
| 3,598,884 | 8/1971 | Wei . |
| 3,639,517 | 2/1972 | Kitchen et al. . |
| 3,646,161 | 2/1972 | Marwede et al. . |
| 3,692,874 | 9/1972 | Farrar et al. . |
| 3,725,369 | 4/1973 | Halasa et al. . |
| 3,985,830 | 10/1976 | Fetters et al. . |
| 3,993,613 | 11/1976 | Doss et al. . |
| 4,076,915 | 2/1978 | Trepka . |
| 4,086,298 | 4/1978 | Fahrbach et al. . |
| 4,092,375 | 5/1978 | Vreugdnhil . |
| 4,145,298 | 3/1979 | Trepka . |
| 4,163,764 | 8/1979 | Nash . |
| 4,238,202 | 12/1980 | Trepka et al. . |
| 4,391,949 | 7/1983 | St. Clair . |
| 4,444,953 | 4/1984 | St. Clair . |
| 4,849,481 | 7/1989 | Rhodes . |
| 5,369,175 | 11/1994 | Hoxmeier et al. . |
| 5,393,841 | 2/1995 | Himes . |

FOREIGN PATENT DOCUMENTS

| | | |
|---|---|---|
| 0314256 | 5/1989 | European Pat. Off. . |
| 0516203A2 | 4/1992 | European Pat. Off. . |
| 0524765A1 | 7/1992 | European Pat. Off. . |

OTHER PUBLICATIONS

Ser. No. 08/336,632 Nov. 9, 1994 Himes et al.
Ser. No. 08/149,596 Nov. 9, 1993 Chin et al.
Ser. No. 08/150,929 Nov. 10, 1993 Hoxmeier et al.

*Primary Examiner*—Joseph L. Schoffer
*Assistant Examiner*—I. Zemel
*Attorney, Agent, or Firm*—Donald F. Haas

[57] ABSTRACT

A low viscosity adhesive composition which comprises:

(a) an asymmetric radial block copolymer of a vinyl aromatic hydrocarbon and at least one conjugated diene having from 3 to 6 polymer arms, which:
  (i) contains from 33 to 85% by weight of polyvinyl aromatic hydrocarbon block/polydiene block copolymer arms and the balance polydiene homopolymer arms,
  (ii) has vinyl aromatic hydrocarbon blocks with block molecular weights of from 8000 to 30,000,
  (iii) has conjugated diene blocks in the copolymer arms with a molecular weight of at least 6000, and
  (iv) has a polyvinyl aromatic hydrocarbon content of from 10 to 40% by weight; and
(b) from 20 to 400 parts per hundred parts of polymer of a tackifying resin.

The invention also encompasses the polymers used in the adhesive.

3 Claims, No Drawings

LOW VISCOSITY ADHESIVE COMPOSITIONS CONTAINING ASYMMETRIC RADIAL POLYMERS

This is a division, of application Ser. No. 08/336,458, filed Nov. 9, 1994.

FIELD OF THE INVENTION

The invention described herein relates to adhesive compositions which have a low viscosity and can be applied to thin substrates and to polymers used in such compositions. More particularly, this invention relates to the use of particular low viscosity asymmetric radial block copolymers in adhesive formulations.

BACKGROUND OF THE INVENTION

Block copolymers have been employed in adhesive compositions for many years, primarily because of their high cohesive strengths and their ability to phase separate and form physical associations which act as crosslinks which are normally formed by chemical vulcanization. Block copolymers such as those described in U.S. Pat. No. 3,239,478 are either linear or radial or star styrene-butadiene or styrene-isoprene block copolymers. These polymers generally have high cohesive strength and can be readily tackified to yield good adhesive properties.

The use of many of these polymers in certain applications is limited because the viscosities of the polymers are too high. For instance, adhesive manufacturers would like to lower the application temperature of hot melt adhesives in order to apply them to thinner substrates and to improve the melt stability of the adhesive. However, lower application temperatures (less than 300° F.) result in unacceptably high adhesive melt viscosities so that common processing and application equipment cannot be used. The common solution to this problem has been to add diblock polymer or make the main polymer with a high percentage of uncoupled diblock arms. This lowers the viscosity but has the undesirable effect of lowering the tensile strengths of these polymers and adhesives produced with them have poor properties. U.S. Pat. No. 4,391,949 suggested another approach whereby a star-shaped asymmetric block copolymer having styrene-diene and diene homopolymer arms was used. These star polymers generally have very high viscosities, i.e. 40,000 to 100,000 cps in adhesive compositions containing 40% polymer by weight.

Thus, it can be seen that there is a need for polymers which can be used to produce adhesives with a better balance of properties, e.g. to be able to retain good adhesive properties and have lower viscosities. As will be seen below, the present invention helps to satisfy that need.

SUMMARY OF THE INVENTION

The present invention provides a low viscosity adhesive composition which is comprised of a tackifying resin and an asymmetric radial vinyl aromatic hydrocarbon/conjugated diene block copolymer having from three to six arms which:

i) contains from 33 to 85% by weight of polyvinyl aromatic hydrocarbon block/conjugated diene block copolymer arms and the balance homopolymer arms, ii) has vinyl aromatic hydrocarbon blocks with a molecular weight of 8000 to 30,000, iii) has conjugated diene blocks in the copolymer arms with a molecular weight of at least 6000, and iv) has a polyvinyl aromatic hydrocarbon content of from 10 to 40% by weight. The composition also preferably contains from 20 to 400 parts per hundred rubber (phr) of a compatible tackifying resin. Parts per hundred rubber is a commonly used means for describing the concentrations of the components in adhesive and other formulations. The "rubber" is the polymer and it is referred to that way because it has elastomeric properties. The preferred vinyl aromatic hydrocarbon is styrene and the preferred dienes are isoprene and butadiene.

DESCRIPTION OF THE INVENTION

The block copolymers of the present invention have an idealized structure as follows:

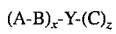

$(A-B)_x-Y-(C)_z$

The subscript x ranges from 2 to 4 and z ranges from 1 to 4 and x+z ranges from 3 to 6 (these asymmetric radial block copolymers may have from 3 to 6 arms). The A blocks are polymer blocks of a vinyl aromatic hydrocarbon. Preferably, the vinyl aromatic hydrocarbon is styrene. Other useful vinyl aromatic hydrocarbons include alphamethyl styrene, various alkyl-substituted styrenes, alkoxy-substituted styrenes, vinyl naphthalene, vinyl toluene and the like. The B and C blocks are polymer blocks of conjugated dienes, Preferred dienes include butadiene and isoprene. Other dienes may also be used, including piperylene, methylpentyldiene, phenylbutadiene, 3,4-dimethyl- 1,3-hexadiene, 4,5-diethyl-1,3-octadiene and the like, preferably those conjugated dienes containing 4 to 8 carbon atoms. The conjugated diene iv) has a polyvinyl aromatic hydrocarbon content of from 10 to 40% by weight.

The composition also preferably contains from 20 to 400 parts per hundred rubber (phr) of a compatible tackifying resin. Parts per hundred rubber is a commonly used means for describing the concentrations of the components in adhesive and other formulations. The "rubber" is the polymer and it is referred to that way because it has elastomeric properties. The preferred vinyl aromatic hydrocarbon is styrene and the preferred dienes are isoprene and butadiene.

DESCRIPTION OF THE INVENTION

The block copolymers of the present invention have an idealized structure as follows:

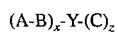

$(A-B)_x-Y-(C)_z$

The subscript x ranges from 2 to 4 and z ranges from 1 to 4 and x+ z ranges from 3 to 6 (these asymmetric radial block copolymers may have from 3 to 6 arms). The A blocks are polymer blocks of a vinyl aromatic hydrocarbon. Preferably, the vinyl aromatic hydrocarbon is styrene. Other useful vinyl aromatic hydrocarbons include alphamethyl styrene, various alkyl-substituted styrenes, alkoxy-substituted styrenes, vinyl naphthalene, vinyl toluene and the like. The B and C blocks are polymer blocks of conjugated dienes. Preferred dienes include butadiene and isoprene. Other dienes may also be used, including piperylene, methylpentyldiene, phenylbutadiene, 3,4-dimethyl- 1,3-hexadiene, 4,5-diethyl-1,3-octadiene and the like, preferably those conjugated dienes containing 4 to 8 carbon atoms. The conjugated diene employed in the B block may differ from that employed in the C block. Mixtures of conjugated dienes may also be employed.

The Y moiety stands for the multifunctional coupling agent used herein. In general, any of the coupling agents known in the prior art to be useful in forming a radial polymer by contacting the same with a living polymer may be used in both the method of this invention and the asymmetric radial polymers of this invention. In general, suitable coupling agents will contain three or more functional groups which will react with the living polymer at the metal-carbon bond. Suitable coupling agents, then, include $SiX_4$, $RSiX_3$, $HSiX_3$, $X_3Si-SiX_3$, $X_3Si-(CH_2)_x-SiX_3$, $RX_2Si-(CH_2)_x-SiX_2R$, $RX_2Si-(CH_2)_x-SiX_2-(CH_2)_x-SiX_2R$, $R_2XSi-(CH_2)_x-SiX_2R$, and the like. In the foregoing formulae: each X may, independently, be fluorine, chlorine, bromine, iodine, alkoxide radicals, hydride and the like; R is a hydrocarbyl radical having from 1 to about 10 carbon atoms, preferably from 1 to about 6 carbon atoms; and x is a whole number from 1 to about 6. Particularly useful coupling agents to prepare four armed asymmetric radial polymers include the silicon tetrahalides such as silicon tetrafluoride, silicon tetrachloride, silicon tetrabromide, and the like, and the tetraalkoxysilanes such as tetramethoxysilane, tetraethoxysilane, tetrapropoxysilane, and the like. Particularly useful coupling agents for preparing 6 armed polymers include $X_3Si-(CH_2)_n-SiX_3$ where $n \geq 0$ and X is halogen, alkoxy, hydride, including bis-trimethoxy-silylethane, bis-trichlorosilylethane, and 1,6-bis(trichlorosilyl)hexane. The preferred coupling agent to make 6 armed polymers is bis-trichlorosilylethane because it gives the highest coupling yield.

The letters x and z in the foregoing formula stand for the average number of arms of each type in each polymer composition. In the polymers made according to the present invention, x+ z is 3 to 6. x and z are integers when referring to a single polymer molecule. The polymer composition may be comprised of predominantly one structure (i.e., the predominant asymmetric species contains exactly x polyvinyl aromatic hydrocarbon/conjugated diene block copolymer arms and y homopolymer arms) or it may comprise a mixture of asymmetric radial polymeric species which, on average, contain x copolymer arms and y homopolymer arms. The exact polymer composition (i.e., whether it is composed of predominantly one structure or a mixture of species) may vary with the total number of arms, the coupling agent used, the polymer arm composition, the ratio of different polymer arm types, and/or polymer arm molecular weight.

At the lower end of the 33 to 85% w block copolymer content range, asymmetric polymers with, on average, less than two copolymer arms will be too weak to make an acceptable adhesive. If the polymer is at the high end of this range, it could have, on average, less than two block copolymer arms and have sufficient strength.

In general, the polymers of this invention may be prepared using any of the well known methods used for coupling radial polymers. These methods are particularly suitable for the preparation of asymmetric radial polymers from so-called "living" polymers containing a single terminal metal ion. For example, suitable coupling methods are described in U.S. Pat. No. 4,096,203 and EP 0,314,256. These references are herein incorporated by reference. A preferred process is one wherein the different arms to be contained in the asymmetric radial polymer are contacted sequentially with the coupling agent. Generally, the coupling sequence will be controlled by the relative number of each arm sought in the final product with that polymer intended to provide the greater number of arms contacted with the coupling agent first and that polymer intended to provide the next greatest number of arms contacted with the coupling agent second. Another preferred method involves the use of a protected functional initiator.

As is well known in the prior art, "living" polymers are polymers containing at least one active group such as a metal atom bonded directly to a carbon atom. "Living" polymers are readily prepared via anionic polymerization. Living polymers containing a single terminal group are, of course, well known in the prior art. Methods for preparing such polymers are taught, for example, in U.S. Pat. Nos. 3,150,209; 3,496,154; 3,498,960; 4,145,298 and 4,238,202. Methods for preparing block copolymers such as those preferred for use in the method of the present invention are also taught, for example, in U.S. Pat. Nos. 3,231,635; 3,265,765 and 3,322,856. These patents are herein incorporated by reference. When the polymer product is a random or tapered copolymer, the monomers are, generally, added at the same time, although the faster reacting monomer may be added slowly in some cases, while, when the product is a block copolymer, the monomer used to form the separate blocks are added sequentially.

In general, the polymers useful as arms in both the method of this invention and the asymmetric radial polymer of this invention may be prepared by contacting the monomer or monomers with an organoalkali metal compound in a suitable solvent at a temperature within the range from −150° C. to 300° C., preferably at a temperature within the range from 0° C. to 100° C. Particularly effective polymerization initiators are organolithium compounds having the general formula:

RLi wherein R is an aliphatic, cycloaliphatic, alkyl-substituted cycloaliphatic, aromatic or alkyl-substituted aromatic hydrocarbon radical having from 1 to 20 carbon atoms.

Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents, then, include aliphatic hydrocarbons such as butane, pentane, hexane, heptane and the like, cycloaliphatic hydrocarbons such as cyclohexane, cycloheptane and the like, alkyl-substituted cycloaliphatic hydrocarbons such as methylcyclohexane, methylcycloheptane and the like, aromatic hydrocarbons such as benzene and the alkyl-substituted aromatic hydrocarbons such as toluene, xylene and the like and ethers such as tetrahydrofuran, diethylether, di-n-butyl ether and the like.

It is desirable that the polymers of the present invention contain from 33 to 85% by weight of polyvinyl aromatic hydrocarbon block/polydiene block copolymer arms (for convenience, these will hereinafter be referred to as SI arms, with the S standing for styrene and the I standing for isoprene; however, the following description is meant to be applicable to polymers containing the other vinyl aromatic hydrocarbons and dienes described above). If the SI arm content is less than 33%, the polymer will be too weak and adhesive properties will be unacceptable. If the SI arm content is higher than 85%, then the polymer will only be marginally effective in reducing the viscosity of the adhesive formulation.

If the polystyrene block molecular weights are less than 8000, again the polymer will be too weak and adhesive properties will be poor. If the polystyrene block molecular weights are more than 30,000, then the viscosity will be very high. The polydiene block molecular weights in the copolymer arms must be greater than 6000 in order to form effective chain entanglements leading to elastomeric behavior. The overall molecular weight of the polymer may vary over a wide range, i.e. from 50,000 to 400,000. However, for any specified molecular weight and polyvinyl aromatic hydrocarbon content (for convenience, this will be referred to hereinafter as PSC-polystyrene content in % by weight), the asymmetric radial polymers described herein will exhibit a lower viscosity than the corresponding linear polymers while retaining the advantageous properties of the linear polymers in formulating adhesives. Corresponding symmetric radial polymers are too weak as shown below.

The molecular weights of the blocks and polymers referred to herein are determined as follows. Molecular weights of linear polymers or unassembled linear segments of polymers such as mono-, di-, triblock, etc., arms of radial polymers before coupling are conveniently measured by Gel Permeation Chromatography (GPC), where the GPC system has been appropriately calibrated. For anionically polymerized linear polymers, the polymer is essentially monodisperse and it is both convenient and adequately descriptive to report the "peak" molecular weight of the narrow molecular weight distribution observed. The peak molecular weight is usually the molecular weight of the main species shown on the chromatograph. For materials to be used in the columns of the GPC, styrene-divinyl benzene gels or silica gels are commonly used and are excellent materials. Tetrahydrofuran is excellent solvent for polymers of the type described herein. Ultraviolet or refractive index detectors may be used.

The PSC of these polymers is important because if it is too low, the strength of the polymer will be insufficient and if it is too high, the polymer will be stiff and not behave like an elastomer. It is preferred that the PSC range from 10 to 40% by weight.

If desired, these block copolymers may be hydrogenated. Unhydrogenated, partially hydrogenated, and fully hydrogenated polymers are included within the scope of this invention. Hydrogenation may be effected selectively as disclosed in U.S. Pat. Reissue No. 27,145 which is herein incorporated by reference. The hydrogenation of these copolymers may be carried out by a variety of well established processes including hydrogenation in the presence of such catalysts as Raney Nickel, nobel metals such as platinum and the like, soluble transition metal catalysts and titanium catalysts as in U.S. Pat. No. 5,039,755 which is also incorporated by reference. The polymers may have different diene blocks and these diene blocks may be selectively hydrogenated as described in U.S. Pat. No. 5,229,464 which is also herein incorporated by reference.

It is common practice to add an adhesion promoting or tackifying resin that is compatible with the polymer, generally from 20 to 400 parts per hundred parts of polymer. A common tackifying resin is a diene-olefin copolymer of piperylene and 2-methyl-2-butene having a softening point of about 95° C. This resin is available commercially under the tradename Wingtack® 95 and is prepared by the cationic polymerization of 60% piperlene, 10% isoprene, 5% cyclopentadiene, 15% 2-methyl-2-butene and about 10% dime), as taught in U.S. Pat. No. 3,577,398. Other tackifying resins may be employed wherein the resinous copolymer comprises 20–80 weight percent of piperylene and 80–20 weight percent of 2-methyl-2-butene. The resins normally have ring and ball softening points as determined by ASTM method E28 between about 80° C. and 115° C.

Aromatic resins may also be employed as tackifying agents, provided that they are compatible with the particular polymer used in the formulation. Normally, these resins should also have ring and ball softening points between about 80° C. and 115° C. although mixtures of aromatic resins having high and low softening points may also be used. Useful resins include coumarone-indene resins, polystyrene resins, vinyl toluene-alpha methylstyrene copolymers and polyindene resins.

Other adhesion promoting resins which are also useful in the compositions of this invention include hydrogenated rosins, esters of rosins, polyterpenes, terpenephenol resins and polymerized mixed olefins, lower softening point resins and liquid resins. An example of a liquid resin is Adtac® LV resin from Hercules. To obtain good thermo-oxidative and color stability, it is preferred that the tackifying resin be a saturated resin, e.g., a hydrogenated dicyclopentadiene resin such as Escorez® 5000 series resin made by Exxon or a hydrogenated polystyrene or polyalphamethylstyrene resin such as Regalrez® resin made by Hercules. Softening points of solid resins may be from about 40° C. to about 120° C. Liquid resins, i.e., softening points less than room temperature, may be used as well as combinations of solid and liquid resins. The amount of adhesion promoting resin employed varies from 20 to 400 parts by weight per hundred parts rubber (phr), preferably between 20 to 350 phr, most preferably 50 to 300 phr. The selection of the particular tackifying agent is, in large part, dependent upon the specific polymer employed in the respective adhesive composition.

A composition of the instant invention may contain plasticizers, such as rubber extending plasticizers, or compounding oils or organic or inorganic pigments and dyes. Rubber compounding oils are well-known in the art and include both high saturates content oils and naphthenic oils. Preferred plasticizers are highly saturated oils, e.g. Tufflo® 6056 and 6204 oil made by Arco and naphthenic process oils, e.g. Shellflex® 371 oil made by Shell. The amounts of rubber compounding oil employed in the invention composition can vary from 0 to 150 phr, preferably form 0 to 80 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the composition. Combinations of primary and secondary antioxidants are preferred. Such combinations include sterically hindered phenolics with phosphites or thioethers, such as hydroxyphenylpropionates with aryl phosphates or thioethers, or amino phenols with aryl phosphates. Specific examples of useful antioxidant combinations include 3-(3, 5-di-t-butyl- 4-hydroxyphenyl)propionate)methane (Irganox® 1010 from Ciba-Geigy) with tris(nonylphenyl)-phosphite (Polygard® HR from Uniroyal), Irganox® 1010 with bis(2,4-di-t-butyl)pentaerythritol diphosphite (Ultranox® 626 from Borg-Warner).

All compositions based on the polymers of this invention will contain some combination of the various formulating ingredients disclosed herein. No definite rules can be offered about which ingredients will be used. The skilled formulator will choose particular types of ingredients and adjust their concentrations to give exactly the combination of properties needed in the composition for any specific adhesive or sealant application. A formulator skilled in the art will see tremendous versatility in the asymmetric radial polymers of this invention to prepare adhesives and sealants having properties suitable for many different applications.

The adhesive compositions of the present invention can be prepared by blending the components at an elevated temperature, preferably between about 50° C. and about 200° C., until a homogeneous blend is obtained, usually less than three (3) hours. Various methods of blending are known to the art and any method that produces a homogenous blend is satisfactory. The resultant compositions may then be used in a wide variety of applications. Alternatively, the ingredients may be blended into a solvent.

There are several advantages of using lower viscosity polymers in adhesives. First, the lower viscosity means that higher solids contents can be tolerated in solvent based formulations. This will reduce the volatile organic content of the formulation. The reduced viscosity of 100% solids adhesive formulations allows for easier processing, lower heating (energy) requirements, lower processing temperatures which results in less degradation of the polymer during processing and allows the formulation to be applied in thinner layers while avoiding the problem of burn through.

These polymer are useful in a wide variety of adhesive applications including tapes, labels, diaper assembly, decals, bookbinding, and construction mastics. However, they are most useful in applications where low viscosity is advantageous such as hot melt assembly adhesives.

EXAMPLES

In the following examples, polymers were synthesized by standard anionic polymerization techniques under an inert nitrogen atmosphere using sec-butyllithium in cyclohexane solution (12% w) as initiator.

Polymer 1

An asymmetric radial polymer was prepared by polymerizing in a first reactor 30.2 lb of styrene in 270.86 lb of cyclohexane solvent with 845 mls of sec-butyllithium anionic polymerization initiator at 60° C. for 10 half-lives. Following this polymerization, 105.34 lb of the living polystyryl lithium in cyclohexane was transferred to a reactor containing 203.45 lb of cyclohexane and 42 lb of isoprene was added and the isoprene polymerized at 60° C. for at least 10 half lives. In a separate reactor, 13.1 lb of isoprene in 74.22 lb of cyclohexane was polymerized using 411 mls of sec-butyllithium at 60° C. for at least 10 half lives. To this polyisoprene was added 41.3 g of 1,2-bis(trichlorosilyl)ethane coupling agent and the mixture was reacted for 45 min at 60° C. To this partially coupled intermediate was added 263.27 lb of the solution of styrene-isoprene diblock copolymer in cyclohexane and 48 mls of 1,2-dimethoxyethane. This mixture was reacted for 60 min at 60° C. to achieve coupling of the remaining sites of the partially coupled intermediate. Any remaining living polymer arms were terminated by the addition of 23 mls of methanol, and the resulting polymer was isolated by contacting the polymer solution with high pressure steam followed by removal of the solid polymer from the liquid phase. The product polymer was determined to have a polystyrene molecular weight of 11,200 g/mole and a polyisoprene molecular weight of 44,700 in the diblock copolymer arms and a homopolyisoprene arm molecular weight of 10,700 g/mole by gel permeation chromatography (GPC). The polystyrene content as determined by $^1$H NMR is 12.7% w.

Polymer 2

An asymmetric radial polymer was prepared by polymerizing in a first reactor 14.9 lb of styrene in 277 lb of cyclohexane solvent with 410 mls of sec-butyllithium anionic polymerization initiator at 60° C. for 10 half-lives. Following polymerization of the styrene, 58.8 lb of isoprene was added and the isoprene polymerized at 70° C. for at least 10 half-lives. In a separate reactor, 13.3 lb of isoprene in 149.54 lb of cyclohexane was polymerized using 440 mls of sec-butyllithium at 60° C. for at least 10 half-lives. To this polyisoprene was added 43.3 g of 1,2-bis(trichlorosilyl)ethane coupling agent and the mixture was reacted for 60 min at 60° C. To this partially coupled intermediate was added 187.66 lb of the solution of polystyrene-polyisoprene diblock copolymer in cyclohexane from the first reactor and 15.89 mls of 1,2-dimethoxyethane. This mixture was reacted for 60 min at 60° C. to achieve coupling of the remaining sites of the partially coupled intermediate. Any remaining living polymer arms were terminated by the addition of approximately 40 mls of methanol, and the resulting polymer was isolated by contacting the polymer solution with high pressure steam followed by removal of the solid polymer from the liquid phase. The product polymer was determined to have a polystyrene molecular weight of 11,800 g/mole and a polyisoprene molecular weight of 48,000 in the diblock copolymer arms and a molecular weight of 11,600 g/mole of the homopolyisoprene arms by gel permeation chromatography (GPC). The polystyrene content as-determined by $^1$H NMR is 13.2% w.

Polymer 3, 4, 5, and 6

Four asymmetric radial polymers were prepared in the same manner as Example 2 except for changes in the amount of solvent, reagents, and coupling conditions used. Table 1 describes the polymerization and analysis of these polymers.

TABLE 1

|  | Polymer 3 | Polymer 4 | Polymer 5 | Polymer 6 |
| --- | --- | --- | --- | --- |
| First reactor |  |  |  |  |
| lbs of cyclohexane | 280.56 | 276.84 | 280.4 | 80.1 |
| lbs of styrene | 28.2 | 26.2 | 30.2 | 3.54 |
| mls of sec-butyllithium | 590 | 810 | 680 | 106.35 |
| lbs of isoprene | 42$^a$ | 47.6 | 40 | 16.47 |
| Second reactor |  |  |  |  |
| lbs of cyclohexane | 221.09 | 273.02 | 346.24 | 55.65 |
| lbs of isoprene | 42.8 | 48.6 | 61.4 | 1.41 |
| mls of sec-butyllithium | 800 | 610 | 700 | 84.87 |
| First coupling step |  |  |  |  |
| g of 1,2-bis(trichlorosilyl)ethane | 90 | 65 | 73 | 8.66 |
| coupling temperature (°C.) | 60 | 60 | 60 | 60 |
| coupling time | 60 | 75 | 60 | 25 |

TABLE 1-continued

|  | Polymer 3 | Polymer 4 | Polymer 5 | Polymer 6 |
|---|---|---|---|---|
| Second coupling step |  |  |  |  |
| lbs of S—I in cyclohexane transferred | 236.33 | 179.17 | 143.18 | 47.25 |
| activator type | 1,2-dimethoxyethane | a-dimethoxybenzene | a-dimethoxybenzene | 1,2-diemthoxyethane |
| mls of activator | 81 | 70 | 63 | 32.36 |
| coupling temperature (°C.) | 70 | 70 | 70 | 80 |
| coupling time | 24 hrs | 3 hrs | 3 hrs | 75 min |
| mls of Methanol | 0 | 35 | 38 | 15 |
| Polymer characteristics[b] |  |  |  |  |
| styrene block MW | 14,800 | 10,600 | 14,400 | 12,000 |
| isoprene of S—I arm MW | 23,060 | 19,100 | 20,300 | 45,000 |
| isoprene of I arm MW | 16,300 | 25,900 | 28,600 | 9,900 |
| polystyrene content (% w) | 21.3 | 16.1 | 14.2 | 16 |

[a]In this example, following polymerization of the isoprene, 186.4 g of butadiene was polymerized for 5 half-lives to provide a small block of polybutadiene on each polystyrene-polyisoprene diblock copolymer chain.
[b]Molecular weights determined by GPC. Polystyrene contents determined by $^1$H NMR.

Polymer 7

An asymmetric radial polymer was prepared by polymerizing in a first reactor 4.18 lb of styrene in 79.99 lb of cyclohexane solvent with 120.17 mls of sec-butyllithium anionic polymerization initiator at for 10 half-lives. Following polymerization of the styrene, 16.8 lb of butadiene was added and the butadiene polymerized at 70° C. for 15 half-lives. In a separate reactor, 2.46 lb of isoprene in 59.8 lb of cyclohexane was polymerized using 88.2 mls of sec-butyllithium at 80° C. for at least 10 half-lives. To this polyisoprene was added 9.0 g of 1,2-bis(trichlorosilyl)ethane coupling agent and the mixture was reacted for 55 minutes at 60° C. To this partially coupled intermediate was added 43.42 lb of the solution of polystyrene-polybutadiene diblock copolymer in cyclohexane from the first reactor and 6 mls of 1,2-dimethoxyethane. This mixture was reacted for 90 min at 70° C. to achieve coupling of the remaining sites of the partially coupled intermediate. Any remaining living polymer arms were terminated by the addition of approximately 15 mls of methanol, and the resulting polymer was isolated precipitation into isopropanol. The product polymer was determined to have a polystyrene molecular weight of 10,800 g/mole and a polybutadiene molecular weight of 45,000 in the diblock copolymer arms and a molecular weight of 9,900 g/mole of the homopolyisoprene arms by gel permeation chromatography (GPC). The polystyrene content as determined by $^1$H NMR is 16% w.

Polymer 8

An asymmetric radial polymer was prepared by polymerizing in a first reactor 4.63 lb of styrene in 79.98 lb of cyclohexane solvent with 31 mls of sec-butyllithium anionic polymerization initiator at 35° C. for 9 half-lives. Following polymerization of the styrene, 15.38 lb of butadiene was added and the butadiene polymerized at 70° C. for at least 10 half-lives. In a separate reactor, 3.49 lb of butadiene in 63.99 lb of cyclohexane was polymerized using 29 mls of sec-butyllithium at 80° C. for at least 10 half-lives. To this polybutadiene was added 12.75 g of 1,2-bis(trichlorosilyl) ethane coupling agent and the mixture was reacted for 30 min at 60° C. To this partially coupled intermediate was added 35.02 lb of the solution of polystyrene-polybutadiene diblock copolymer in cyclohexane from the first reactor and 8 mls of 1,2-dimethoxyethane. This mixture was reacted for at least 90 min at 80° C. to achieve coupling of the remaining sites of the partially coupled intermediate. Any remaining living polymer arms were terminated by the addition of approximately 15 mls of methanol, and the resulting polymer was isolated by precipitation into isopropanol. The product polymer was determined to have a polystyrene molecular weight of 11,000 g/mole and a polybutadiene molecular weight of 38,000 in the diblock copolymer arms and a molecular weight of 9200 g/mole of the homopolybutadiene arms by gel permeation chromatography (GPC). The polystyrene content as determined by $^1$H NMR is 16% w.

Polymer 9

An asymmetric radial polymer was prepared by polymerizing in a first reactor 24.8 lb of styrene in 242 lb of cyclohexane solvent containing 21 lb of diethylether with 975 mls of sec-butyllithium anionic polymerization initiator at 60° C. for 8 half-lives. Following polymerization of the styrene, 62.6 lb of butadiene was added and the isoprene polymerized at 60° C. for 10 half-lives. In a separate reactor 38.6 lb of isoprene in 226.4 lb of cyclohexane was polymerized using 870 mls of sec-butyllithium at 60° C. for 10 half-lives. Following polymerization of the isoprene, 2 lb of butadiene was polymerized for 8 half-lives at 60° C. to provide a small butadiene block for improved coupling. To this living polymer was added 72 mls of tetramethoxysilane coupling agent and the mixture was reacted for 30 min at 60° C. To this partially coupled intermediate was added 285 lb of the solution of polystyrene-polybutadiene diblock copolymer in cyclohexane from the first reactor and 180 mls of 1,2-dimethoxyethane. This mixture was reacted for 60 min at 80° C. to achieve coupling of the remaining sites of the partially coupled intermediate. Any remaining living polymer arms were terminated by the addition of approximately 8 mls of methanol, and the resulting polymer was isolated by precipitation into isopropanol. The product polymer was determined to have a polystyrene molecular weight of 9,700 g/mole and a polybutadiene molecular weight of 23,200 in the diblock copolymer arms and a molecular weight of 16,300 g/mole of the homopolyisoprene arms by gel permeation chromatography (GPC). The polystyrene content as determined by $^1$H NMR is 18.5% w.

Polymer 10

An asymmetric radial polymer was prepared by polymerizing in a first reactor 6.28 lb of styrene in 170 lb of cyclohexane solvent with 210 mls of sec-butyllithium anionic polymerization initiator at 60° C. for 10 half-lives. Following polymerization of the styrene, 23.85 lb of isoprene was added and the isoprene polymerized at 60° C. for at least 10 half-lives. To this living polystyrene-polyisoprene diblock copolymer was added 15 mls of methyltrichlorosilane coupling agent and the mixture was reacted for 40 min at 60° C. In a separate reactor, 25.03 lb of isoprene in 225.26 lb of cyclohexane was polymerized using 200 mls of sec-butyllithium at 60° C. for at least 10 half-lives. 120.8 lb of this living polyisoprene in cyclohexane was added to the partially coupled intermediate in the first reactor. This mixture was reacted for 60 min at 70° C. to achieve coupling of the remaining site of the partially coupled intermediate. The resulting polymer was isolated by contacting the polymer solution with high pressure steam followed by removal of the solid polymer from the liquid phase. The product polymer was determined to have a polystyrene molecular weight of 10,500 g/mole and a polyisoprene molecular weight of 39,900 in the diblock copolymer arms and a molecular weight of 39,700 g/mole of the homopolyisoprene arms by gel permeation chromatography (GPC). The polystyrene content as determined by $^1$H NMR is 15.3% w.

Polymer 11

An asymmetric radial polymer was prepared by a two step coupling process in a single reactor system. First, 15.1 grams of isoprene was polymerized in 549 grams of cyclohexane solvent with 1.2 mls of sec-butyllithium anionic polymerization initiator at 60° C. for at least 10 half-lives. To this polyisoprene was added 1.01 grams of 1,2-bis(trichlorosilyl)ethane coupling agent (as a 5% solution in cyclohexane) and the mixture was reacted for 15 min at 60° C. 9.6 grams of styrene was added and polymerized with 0.7 mls of mls of sec-butyllithium anionic polymerization initiator at 60° C. for at least 10 half-lives. Following polymerization of the styrene, 35.8 grams of isoprene was added and the isoprene polymerized at 60° C. for at least 10 half-lives. 0.3 mls of 1,2-diethoxyethane was added and the mixture of partially coupled-intermediate and living polystyrene-polyisoprene polymer was coupled at 80° C. for 60 min. Any remaining living polymer arms were terminated by the addition of 1 ml of methanol, and the resulting polymer was isolated by precipitation into isopropanol. The product polymer was determined to have a polystyrene molecular weight of 8,700 g/mole and a polyisoprene molecular weight of 42,000 in the diblock copolymer arms and a molecular weight of 10,200 g/mole of the homopolyisoprene arms by gel permeation chromatography (GPC). The polystyrene content as determined by $^1$H NMR is 15.1% w.

Comparative Polymer 12

A symmetric radial polymer having six identical polymer arms composed of polystyrene-polyisoprene diblock copolymer was prepared for comparison to the asymmetric radial polymers of this invention. 8.7 g of Styrene was polymerized in 540 g of cyclohexane solvent with 1.51 mls of sec-butyllithium anionic polymerization initiator at 60° C. for 20 minutes. Following this polymerization, 55 g of isoprene was added and the isoprene polymerized at 60° C. for at 20 minutes. To this living polystyrene-polyisoprene block copolymer was added 93 mg of 1,2-bis(trichlorosilyl)ethane coupling agent and 0.4 ml of 1,2-diethoxyethane and the mixture was reacted for 60 min at 80° C. Any remaining living polymer arms were terminated by the addition of 1 ml of methanol, and the resulting polymer was isolated by precipitation into isopropanol. The product polymer was determined to have a polystyrene molecular weight of 4,300 g/mole and a polyisoprene molecular weight of 25,500 g/mole by gel permeation chromatography (GPC). The polymer is composed of 90% w 6-arm symmetric radial polymer —(SI)$_6$—and 10% w uncoupled SI diblock copolymer. The polystyrene content as determined by $^1$H NMR is 14.9% w.

Neat Polymer Properties

Polymer solution viscosities were determined using a Brookfield Viscometer using a #21 spindle. Tensile properties were determined on specimens cut from toluene cast plaques 0.03–0.06 inches thick.

Adhesive Preparation and Evaluation

To prepare the following adhesive formulations, the ingredients were solution blended in toluene and cast from this solution onto Mylar for preparation of specimens for adhesive property testing. Final adhesive thickness after drying was about 0.0016 inches. To determine the melt viscosity of the adhesive formulations, either the toluene solvent was evaporated from the solution, or a separate, identical formulation was prepared without the solvent by batch mixing a melt in a Baker Perkins Hot Oil Mixer at 350° F. Melt viscosities were determined on a Brookfield Viscometer using a #29 spindle.

The SAFT (shear adhesion failure temperature) was measured by 1"×1" Mylar to Mylar lap joint with a 1 kg weight. SAFT measures the temperature at which the lap shear assembly fails under load. Rolling Ball Tack (RBT) is the distance a steel ball rolls on the adhesive film with a standard initial velocity (Pressure Sensitive Tape Council Test No. 6). Small numbers indicate aggressive tack. Holding Power (HP) is the time required to pull a standard area (½ in.×½ in.) of tape from a standard test surface (steel, Kraft paper) under a standard load (2 kg), in shear at 2° antipeel (Pressure Sensitive Tape Council Method No. 7). Long times indicate high adhesive strength. 180° peel was determined by Pressure Sensitive Tape Council Method No. 1. Large numbers indicate high strength when peeling a test tape from a steel substrate. Polyken probe tack (PPT) was determined by ASTM D-2979. Loop tack (LT) was determined using TLMI loop tack tester. High numbers for PPT and LT indicate aggressive tack. In the following tables, (a) refers to adhesive failure and (c) refers to cohesive failure.

Adhesive formulations were prepared, as described above, using Polymers 1, 2, and 10 with the following composition: 20% w asymmetric radial polymer, 58% w synthetic C5 tackifying resin, 22% w paraffinic/naphthenic oil and 1% w phenolic antioxidant. Neat polymer characteristics and adhesive properties are summarized in Table 2. For comparison, an identical formulation was prepared using a linear polymer containing a mixture of polystyrene-polyisoprene-polystyrene triblock copolymer and polystyrene-polyisoprene diblock copolymer. In all linear polymers in this and the following examples the molecular weight of the polyisoprene block of the polystyrene-polyisoprene-polystyrene triblock copolymer is equal to twice the molecular weight of the polyisoprene block of the polystyrene-polyisoprene diblock copolymer. Properties of the linear polymer and its adhesive is given in Table 2.

TABLE 2

|  | Polymer 1 | Polymer 2 | Polymer 10 | Linear Polymer A |
|---|---|---|---|---|
| Polymer Characteristics | | | | |
| % wt of diblock arms in asymmetric radial polymer | 75 | 75 | 70 | — |
| % w coupled polymer in linear polymer | — | — | — | 62 |
| Polystyrene molecular weight (g/mole) | 11,500 | 11,800 | 10,500 | 10,900 |
| Polyisoprene molecular weight of polystyrene-polyisoprene diblock copolymer (g/mole) | 44,700 | 48,000 | 39,900 | 69,000 |
| Total polymer molecular weight (g/mole) | 155,200 | 166,000 | 140,500 | 159,800 |
| Polystyrene content (% w) | 12.7 | 13.2 | 14.9 | 14.8 |
| Solution viscosity (cps) 25% solids in toluene, 25° C. | 277 | 319 | 458 | 822.5 |
| Ultimate tensile strength of neat polymer (psi) | 932 | 602 | 695 | 1590 |
| Adhesive Properties | | | | |
| RB Tack (cm) | 0.9 ± 0.1 | 1.4 ± 0.4 | 0.85 ± 0.39 | 0.8 ± 0.1 |
| Polyken Probe (kg) | 1.43 ± 0.15 | 1.27 ± 0.11 | 1.21 ± 0.23 | 1.16 ± 0.14 |
| Loop Tack (oz.) | 101 ± 5 (c) | 105 ± 6 (a) | 75 ± 13 | 99.7 ± 3.8 (pc) |
| 180° Peel (pli) | 5.4 ± 0.1 (c) | 11.7 ± 0.1 (c) | 5.93 ± 0.78 (c) | 6.45 ± 0.49 (c) |
| HP/Steel (min) | 14.2 ± 1.1 (c) | 10.6 ± 5.0 (c) | 7.25 ± 1.7 (c) | 20.9 ± 0.9 (c) |
| HP/Kraft (min) | 0.8 ± 0.3 (a) | 1.0 (c) | 0.18 ± 0.03 (a) | 1.75 ± 0.35 (a) |
| SAFT/Mylar (°C.) | 47 ± 7 (c) | 50.8 ± 3.9 (c) | 52 ± 2 (c) | 48 ± 6 (pc) |
| SAFT/KRAFT (°C.) | 32 (a) | 40.0 ± 4.2 (c) | 32 ± 2 (a) | 36 ± 0 (a) |
| Melt Viscosity (cps), 350° F. | 580 | 595 | 663 | 1130 |

From the data presented in Table 2, it is apparent that for adhesive compositions of comparable properties, the polymers of this invention have both neat polymer solution viscosity and adhesive formulation melt viscosities which are much lower than that obtained using a linear polymer. The polymers of this invention are much more effective in reducing adhesive composition viscosity than the prior art method of decreasing the amount of coupled liner polymer.

An adhesive formulation was prepared, as described above, using Polymer 11 with the following composition: 20% w asymmetric radial polymer, 58% w synthetic C5 tackifying resin, 22% w paraffinic/naphthenic oil and 1% w phenolic antioxidant. Neat polymer characteristics and adhesive properties are summarized in Table 3. For comparison, an identical formulation was prepared using a polymer containing a mixture of linear polystyrene-polyisoprene-polystyrene triblock copolymer and linear polystyrene-polyisoprene diblock copolymer. In addition, an identical adhesive formulation was prepared using Polymer 12, a six-arm symmetric radial polymer containing polystyrene-polyisoprene arms prepared as described above. Properties of the linear and symmetric radial polymers and their adhesives are given in Table 3.

TABLE 3

|  | Polymer 11 | Linear Polymer B | Radial Comparative Polymer 12 |
|---|---|---|---|
| Polymer Characteristics | | | |
| % wt of diblock arms in asymmetric radial polymer | 75 | — | — |
| % w coupled polymer in linear polymer | — | 30 | 90 |
| Polystyrene MW (g/mole) | 8,700 | 10,800 | 4,300 |
| Polyisoprene MW of polystyrene-polyisoprene block copolymer (g/mole) | 42,000 | 69,000 | 25,500 |
| Total polymer MW (g/mole) | 142,200 | 159,600 | 178,800 |
| Polystyrene content (% w) | 15.1 | 14.8 | 14.9 |
| Solution viscosity (cps) 25% solids in toluene, 25° C. | 153 | 488 | 165 |
| Ultimate tensile strength of neat polymer (psi) | 424 | 487 | 55 |
| Adhesive Properties | | | |
| RB Tack (cm) | 0.8 ± 0.2 | 0.8 ± 0.1 | 17.1 ± 7.8 |
| Polyken Probe (kg) | 1.23 ± 0.32 | 1.01 ± 0.23 | 1.62 ± .18 |
| Loop Tack (oz.) | 118 ± 23 (c) | 89 ± 4 (pc) | 48 ± 6 |

TABLE 3-continued

|  | Polymer 11 | Linear Polymer B | Radial Comparative Polymer 12 |
|---|---|---|---|
| 180° Peel (pli) | 4.25 ± 0.07 (c) | 2.4 ± 0.7 (c) | 3.44 ± 0.06 |
| HP/Steel (min) | 1.6 ± 0.7 (c) | 2.7 ± 0.7 (c) | 1.68 ± 0.04 |
| HP/Kraft (min) | 0.3 ± 0.04 (pc) | 0.53 ± 0.04 (c) | 0.4 |
| SAFT/Mylar (°C.) | 34.8 ± 6.7 (c) | 42.3 ± 3.9 (c) | 35.9 ± 0.1 |
| SAFT/KRAFT (°C.) | 34 (c) | 39.3 ± 0.4 (c) | 30 ± 2.8 |
| Melt Viscosity (cps), 350° F. | 350 | 670 | 380 |

From the data presented in Table 3, it is apparent that for adhesive compositions of comparable properties, the polymers of this invention have both neat polymer solution viscosity and adhesive formulation melt viscosities which are much lower than that obtained using a linear polymer. The polymers of this invention are much more effective in reducing adhesive composition viscosity than the prior art method of decreasing the amount of coupled liner polymer. While the symmetric radial Polymer 12 does result in a very low adhesive formulation melt viscosity, the polymer has very low tensile strength and also produces an unacceptable adhesive, specifically providing poor rolling ball and loop tack.

An adhesive formulation was prepared, as described above, using Polymer 4 with the composition shown in Table 4. Neat polymer characteristics and adhesive properties are summarized in Table 4. For comparison, equivalent formulations were prepared using linear polymers containing of a mixture of polystyrene-polyisoprene-polystyrene triblock copolymer and polystyrene-polyisoprene diblock copolymer. Properties of these linear polymers and compositions and properties of their adhesives are given in Table 4.

From the data presented in Table 4, it is apparent that for adhesive compositions of comparable properties, the polymers of this invention have both neat polymer solution viscosity and adhesive formulation melt viscosities which are much lower than that obtained using a linear polymer. The polymers of this invention are much more effective in reducing adhesive composition viscosity than the prior art method of decreasing the amount of coupled liner polymer. Linear Polymer E produces an unacceptable adhesive which has poor cohesive strength, resulting in very poor holding power and SAFT performance.

Adhesive formulations were prepared, as described above, using Polymers 3 and 5 with the compositions shown in Table 5. Neat polymer characteristics and adhesive properties are summarized in Table 5. For comparison, an equivalent formulation was prepared using a linear polymer containing of a mixture of polystyrene-polyisoprene-polystyrene triblock copolymer and polystyrene-polyisoprene diblock copolymer. Properties of the linear polymer and composition and properties of its adhesive are given in Table 5.

TABLE 4

|  | Polymer 4 | Linear Polymer C | Linear Polymer D | Linear Polymer E |
|---|---|---|---|---|
| Polymer Characteristics |  |  |  |  |
| % wt of diblock arms in asymmetric radial polymer | 44 | — | — | — |
| % w coupled polymer in linear polymer | — | 23 | 14 | 0 |
| Polystyrene MW (g/mole) | 10,600 | 10,800 | 10,800 | 10,800 |
| Polyisoprene MW in polystyrene-polyisoprene diblock copolymer (g/mole) | 19,100 | 69,000 | 69,000 | 69,000 |
| Total polymer MW (g/mole) | 163,000 | 159,600 | 159,600 | 159,600 |
| Polystyrene content (% w) | 16.1 | 14.8 | 14.8 | 14.8 |
| Solution viscosity (cps) 25% solids in toluene, 25° C. | 115 | 378 | 259 | 199 |
| Ultimate tensile strength of neat polymer (psi) | 67 | 226 | 82 | 10 |
| Adhesive Properties |  |  |  |  |
| % Polymer | 50 | 50 | 50 | 50 |
| % Synthetic C5 resin | 49.5 | 50 | 50 | 50 |
| % Paraffinic/Naphthenic Oil | 0.5 | 0 | 0 | 0 |
| % Phenolic Antioxidant | 1 | 1 | 1 | 1 |
| Polykin Probe (kg) | 1.61 | 0.95 | 1.37 | 1.16 |
| Loop Tack (oz.) | 70 | 88 | 137 | 129 |
| 180° Peel (pli) | 4.8 (c) | 10 (c) | 7.3 (c) | 6.9 (c) |
| HP/Steel (min) | 27 | 860 | 39 | 4.1 (c) |
| HP/Kraft (min) | 3 | 14 | 5 | 0.4 (c) |
| SAFT/Mylar (°C.) | 70 (c) | 73 (c) | 70 (c) | 53 (c) |
| SAFT/KRAFT (°C.) | 48 (c) | 55 (a) | 55 (a) | 38 (c) |
| Melt Viscosity (cps), 350° F. | 3,990 | 76,000 | 29,000 | 16,800 |

TABLE 5

|  | Polymer 3 | Polymer 5 | Linear Polymer F |
|---|---|---|---|
| Polymer Characteristics |  |  |  |
| % wt SI arms in asymmetric radial polymer | 52.5 | 32 | — |
| % w coupled polymer in linear polymer | — | — | 35 |
| Polystyrene MW (g/mole) | 14,800 | 14,400 | 15,500 |
| Polyisoprene MW in polystyrene-polyisoprene diblock copolymer (g/mole) | 23,060 | 20,300 | 60,000 |
| Total polymer MW (g/mole) | 140,920 | 183,800 | 151,000 |
| Polystyrene content (% w) | 21.3 | 14.2 | 22 |
| Solution viscosity (cps) 25% solids in toluene, 25° C. | 167 | 161 | 314 |
| Ultimate tensile strength (psi) | 167 | 21 | 237 |
| Adhesive Formulation |  |  |  |
| % Polymer | 50 | 50 | 50 |
| % Synethetic C5 resin | 48.5 | 50 | 48.5 |
| % Paraffinic/Naphthenic Oil | 2.5 | 0 | 1.5 |
| % Phenolic Antioxidant | .5 | .5 | .5 |
| Adhesive Properties |  |  |  |
| Polyken Probe (kg) | 1.46 | 1.29 | 1.35 |
| Loop Tack (oz.) | 97 | 144 | 1.27 |
| 180° Peel (pli) | 3.5 (c) | 3 (c) | 10 (c) |
| HP/Steel (min) | 3900 | 8 | 965 (c) |
| HP/Kraft (min) | 318 | 1 | 306 |
| SAFT/Mylar (°C.) | 80 (c) | 32 (c) | 90 (c) |
| SAFT/KRAFT (°C.) | 72 (c) | 39 (c) | 75 (a) |
| Formulation Melt Viscosity 350° F. (cps) | 334,500 | 94,500 | >2 million |

From the data presented in Table 5, it, is apparent that for adhesive compositions of comparable properties, the polymers of this invention have both neat polymer solution viscosity and adhesive formulation melt viscosities which are much lower than that obtained using a linear polymer. The polymers of this invention are much more effective in reducing adhesive composition viscosity than the prior art method of decreasing the amount of coupled liner polymer. Polymer 5, which contains 32% w polystyrene-polyisoprene diblock copolymer arms, is very effective in reducing the adhesive melt viscosity, it produces an unacceptable adhesive which has poor cohesive strength, resulting in very poor holding power and SAFT performance. Thus, it is important that the asymmetric radial polymers of this invention contain at least 33% by weight of polystyrene-polydiene block copolymer arms Adhesive formulations were prepared, as described above, using Polymers 7, 8, and 9 with the following composition: 20% w asymmetric radial polymer, 58% w styrenated polyterpene tackifying resin, 22% w paraffinic/naphthenic oil and 1% w phenolic antioxidant. Neat polymer characteristics and adhesive properties are summarized in Table 6. For comparison, an identical formulation was prepared using a linear polymer containing a mixture of polystyrene-polybutadiene-polystyrene triblock copolymer and polystyrene-polybutadiene diblock copolymer. Properties of the linear polymer and its adhesive are given in Table 6.

TABLE 6

|  | Polymer 7 | Polymer 8 | Polymer 9 | Linear Polymer G |
|---|---|---|---|---|
| Polymer Characteristics |  |  |  |  |
| % wt of diblock arms in asymmetric radial polymer | 79 | 67 | 66 | — |
| % w coupled polymer in linear polymer | — | — | — | 50 |
| Polystyrene MW (g/mole) | 10,800 | 11,000 | 9,700 | 11,000 |
| Polybutadiene MW in polystyrene-polybutadiene diblock copolymer (g/mole) | 45,000 | 38,000 | 23,200 | 63,500 |
| Total polymer MW (g/mole) | 151,200 | 134,800 | 98,400 | 149,000 |
| Polystyrene content (% w) | 16 | 16 | 18.4 | 12.3 |
| Solution viscosity (cps) 25% | 1263 | 996 | 216 | 6010 |

TABLE 6-continued

|  | Polymer 7 | Polymer 8 | Polymer 9 | Linear Polymer G |
|---|---|---|---|---|
| solids in toluene, 25° C. | | | | |
| Ultimate tensile strength of neat polymer (psi) | 764 | 450 | 221 | 999 |
| Adhesive Properties | | | | |
| RB Tack (cm) | 1.1 ± 0.2 | 0.9 ± 0.1 | 2.1 ± 0.5 | 0.8 ± 0.1 |
| Polyken Probe (kg) | 1.34 ± 0.06 | 1.18 ± 0.19 | 1.81 ± 0.13 | 0.93 ± 0.11 |
| Loop Tack (oz.) | 88 ± 0 (sl c) | 107.5 ± 4.95 (pc) | 119 ± 18.4 | 103.5 ± 20.5 (a) |
| 180° Peel (pli) | 6.55 ± 0.21 (c) | 6.35 ± 0.07 (c) | 5.5 ± 0.14 | 2.63 ± 0.04 (c) |
| HP/Steel (min) | 11.63 ± 3.15 (c) | 3.2 ± 0.71 (c) | 3.53 ± .011 | 8.73 ± 1.66 (c) |
| HP/Kraft (min) | 4.88 ± 0.18 (c) | 2.23 ± 0.04 (c) | 1.53 ± 0.18 | 4.03 ± 0.11 (c) |
| SAFT/Mylar (°C.) | 39.3 ± 0.4 (c) | 38 ± 0 (c) | 36.9 ± 0.14 | 32.5 ± 3.5 (c) |
| SAFT/KRAFT (°C.) | 36.5 ± 0.7 (c) | 36.75 ± .35 (c) | 35.5 ± 0.6 | 34 (c) |
| Melt Viscosity (cps), 350° F. | 1320 | 1280 | 420 | 8130 |

From the data presented in Table 6, it is apparent that for adhesive compositions of comparable properties, the polymers of this invention have both neat polymer solution viscosity and adhesive formulation melt viscosities which are much lower than that obtained using a linear polymer. The polymers of this invention are much more effective in reducing adhesive composition viscosity than the prior art method of decreasing the amount of coupled liner polymer.

Two adhesive formulations were prepared, as described above, using Polymer 1 with the following composition: 20% w asymmetric radial polymer, 58% w hydrogenated hydrocarbon or styrenated polyterpene tackifying resin, 22% w paraffinic/naphthenic oil and 1% w phenolic antioxidant. Neat polymer characteristics and adhesive properties are summarized in Table 7. For comparison, identical formulations were prepared using a linear polymer containing a mixture of polystyrene-polyisoprene-polystyrene triblock copolymer and polystyrene-polyisoprene diblock copolymer. Properties of the linear polymer and its adhesives are given in Table 7.

TABLE 7

|  | Polymer 1 | Polymer H | Polymer 1 | Linear Polymer H |
|---|---|---|---|---|
| Polymer Characteristics | | | | |
| % wt of diblock copolymer arms in asymmetric radial polymer | 75 | — | 75 | — |
| % w coupled polymer in linear polymer | — | 60 | — | 60 |
| Polystyrene MW (g/mole) | 11,200 | 10,600 | 11,200 | 10,600 |
| Polyisoprene MW in polystyrene-polyisoprene diblock copolymer (g/mole) | 44,700 | 52,500 | 44,700 | 52,500 |
| Polystyrene content (% w) | 12.7 | 17.4 | 12.7 | 17.4 |
| Total polymer MW (g/mole) | 154,600 | 126,200 | 154,600 | 126,200 |
| Solution viscosity (cps) 25% solids in toluene, 25° C. | 277 | 424 | 277 | 424 |
| Ultimate tensile strength of neat polymer (psi) | 932 | 657 | 932 | 657 |
| Adhesive Formulation | | | | |
| % Polymer | 20 | 20 | 20 | 20 |
| % Hydrogenated Hydrocarbon Resin | 58 | 58 | 0 | 0 |
| % Styrenated Polyterpene Resin | 0 | 0 | 58 | 58 |
| % Pariffinic/Naphthenic Oil | 22 | 22 | 22 | 22 |
| % Phenolic Antioxidant | 0.5 | 0.5 | 0.5 | 0.5 |
| Melt Viscosity (cps) | | | | |
| 250° F. | 9000 | 29,000 | 5510 | 9980 |
| 300° F. | 3200 | 7800 | 1690 | 2340 |
| 350° F. | 1400 | 3800 | 710 | 995 |

The data presented in Table 7 shows that for adhesive compositions of comparable properties, the polymers of this invention give adhesive formulation melt viscosities which are much lower than that obtained using a linear polymer when a variety of tackifying resins are employed. The polymers of this invention are much more effective in reducing adhesive composition viscosity than the prior art method of decreasing the amount of coupled liner polymer. In addition, the difference in adhesive melt viscosity compared to identical formulations containing linear polymers increases as temperature is decreased. The above melt viscosity versus temperature data fit an Arrhenius relationship and allow prediction of melt viscosities at different temperatures within the measured range. For the above formulations containing hydrogenated hydrocarbon tackifying resin, at 292° F., Polymer 1 adhesive will have an equivalent viscosity to that which Linear Polymer H adhesive has at 350° F. For the above formulations containing styrenated polyterpene tackifying resin, at 330° F., Polymer 1 adhesive will have an equivalent viscosity to that which Linear Polymer H adhesive has at 350° F. This illustrates that the low viscosity asymmetric radial polymers of this invention will allow for processing of adhesive formulations at lower temperatures than linear polymers.

An adhesive formulation was prepared, as described above, using polymer 6 with the following composition: 20% w asymmetric radial polymer, 58% w synthetic C5 tackifying resin, 22% w paraffinic/naphthenic oil and 1% w phenolic antioxidant. Neat polymer characteristics and adhesive properties are summarized in Table 8. For comparison, an identical formulation was prepared using a linear polymer containing a mixture of linear polystyrene-polyisoprene-polystyrene triblock copolymer and linear polystyrene-polyisoprene diblock copolymer. Properties of the linear polymer and its adhesive is given in Table 8.

copolymer arms, is only marginally effective in reducing adhesive melt viscosity when compared to a linear polymer. Thus, it is important that the asymmetric radial polymers of this invention contain 85% w or less styrene/isoprene block copolymer arms.

An adhesive formulation was prepared, as described above, using Polymer 3 with the following composition: 25% w asymmetric radial polymer, 60% w hydrogenated hydrocarbon tackifying resin, 15% w paraffinic/naphthenic oil and 0.5% w phenolic antioxidant. Neat polymer characteristics and adhesive properties are summarized in Table 9. For comparison, an identical adhesive formulation was prepared using a linear polymer containing a mixture of polystyrene-polyisoprene-polystyrene triblock copolymer and polystyrene-polyisoprene diblock copolymer. Properties of the linear polymer and its adhesive are given in Table 9.

TABLE 8

|  | Polymer 6 | Linear Polymer I |
|---|---|---|
| Polymer Characteristics |  |  |
| % wt of diblock arms in asymmetric radial polymer | 86 | — |
| % w coupled polymer in linear polymer | — | 84 |
| Polystyrene MW (g/mole) | 12,000 | 10,800 |
| Polyisoprene MW in polystyrene-polyisoprene diblock copolymer (g/mole) | 45,000 | 69,000 |
| Total polymer MW (g/mole) | 153,600 | 159,600 |
| Polystyrene content (% w) | 16 | 14.8 |
| Solution viscosity (cps) 25% solids in toluene, 25° C. | 708 | 1550 |
| Ultimate tensile strength of neat polymer (psi) | 2140 | 2692 |
| Adhesive Properties |  |  |
| RB Tack (cm) | 1.0 ± 0.2 | 0.8 ± 0.1 |
| Polyken Probe (kg) | 1.10 ± 0.09 | 1.20 ± 0.08 |
| Loop Tack (oz.) | 108.5 ± 3.5 (c) | 88.5 ± 6.0 (a) |
| 180° Peel (pli) | 14.8 ± 0.6 (c) | 7.4 ± .6 (c) |
| HP/Steel (min) | 23.2 ± 5.7 (c) | 23.6 ± 5.5 (c) |
| HP/Kraft (min) | 1.4 ± 0.6 (a) | 1.3 ± 0.1 (a) |
| SAFT/Mylar (°C.) | 47.2 ± 1.6 (pc) | 58 ± 3 (pc) |
| SAFT/KRAFT (°C.) | 30.0 ± 3.5 (a) | 34 ± 2 (a) |
| Melt Viscosity (cps), 350° F. | 1450 | 1630 |

From the data presented in Table 8,, it is apparent that for adhesive compositions of comparable properties, Polymer 6, which contains 86% w polystyrene-polyisoprene diblock

TABLE 9

|  | Polymer 3 | Linear Polymer J |
|---|---|---|
| Polymer Characteristics | | |
| % wt SI arms in Asymmetric Radial Polymer | 52.5 | — |
| % w Coupled Polymer In Linear Polymer | — | 83 |
| Polystyrene MW (g/mole) | 14,800 | 14,700 |
| Polystyrene MW of polystyrene-polyisoprene diblock copolymer (g/mole) | 26,060 | 36,000 |
| Total Polymer MW (g/mole) | 140,920 | 101,400 |
| Polystyrene content (% w) | 21.3 | 30 |
| Solution viscosity (cps) 25% solids in toluene, 25° C. | 90 | 322 |
| Ultimate tensile strength of neat polymer (psi) | 290 | 2446 |
| Adhesive Propeties | | |
| SAFT/Mylar (°C.) | 67 | 74 |
| Melt viscosity (cps) 350° F. | 860 | 2620 |
| % loss in melt viscosity (cps) 350° F. after 48 hours at 350° F. | 33 | 59 |

From the data presented in Table 9, it is apparent that for adhesive compositions of comparable properties, the polymers of this invention have both neat polymer solution viscosity and adhesive formulation melt viscosities which are much lower than that obtained using a linear polymer. The polymers of this invention are much more effective in reducing adhesive composition viscosity than the prior art method of decreasing the amount of coupled liner polymer. In addition, the polymers of this invention also provide an improvement in the melt stability of the adhesive formulation after heat aging.

An adhesive formulation was prepared, as described above, using Polymer 3 with the following composition: 34% w asymmetric radial polymer, 38% w synthetic C5 tackifying resin, 28% w paraffinic/naphthenic oil and 1% w phenolic antioxidant. Neat polymer characteristics and adhesive properties are summarized in Table 10. For comparison, an identical adhesive formulation was prepared using a linear polymer containing a mixture of polystyrene-polyisoprene-polystyrene triblock copolymer and polystyrene-polyisoprene diblock copolymer. Properties of the linear polymer and its adhesive are given in Table 10.

TABLE 10

|  | Polymer 3 | Linear Polymer F |
|---|---|---|
| Polymer Characteristics | | |
| % wt SI arms in Asymmetric Radial Polymer | 52.5 | — |
| % w Coupled Polymer in Linear Polymer | — | 35 |
| Polystyrene MW (g/mole) | 14,800 | 15,500 |
| Polyisoprene MW of polystyrene-polyisoprene diblock copolymer (g/mole) | 26,060 | 60,000 |
| Total Polymer MW (g/mole) | 140,920 | 151,000 |
| Polystyrene content (% w) | 21.3 | 22 |
| Solution viscosity (cps) 25% solids in toluene, 25° C. | 90 | 314 |
| Ultimate tensile strength of neat polymer (psi) | 167 | 237 |

TABLE 10-continued

|  | Polymer 3 | Linear Polymer F |
|---|---|---|
| Adhesive Properties | | |
| RB Tack (cm) | 2.1 | 1.0 |
| Polyken Probe (kg) | 0.666 | 0.580 |
| Loop Tack (oz.) | 94c | 63 |
| 180° Peel (pli) | 2.6c | 4.gc |
| HP/Steel (min) | 8 | 18c |
| HP/Kraft (min) | 2 | 1 |
| SAFT/Mylar (°C.) | 56 | 70 |
| SAFT/KRAFT (°C.) | 75c | 58c |
| Melt Viscosity (cps), 350° F. | 6,000 | 29,000 |
| Solution Viscosity in Cyclohexane at 25° C. | | |
| 20% Polymer | 85 | 257 |
| 25% Polymer | 173 | 585 |
| 30% Polymer | 514 | 2860 |
| 35% Polymer | 3240 | 11,810 |

From the data presented in Table 10, it is apparent that for adhesive compositions of comparable properties, the polymers of this invention have both neat polymer solution viscosity and adhesive formulation melt viscosities which are much lower than that obtained using a linear polymer. The polymers of this invention are much more effective in reducing adhesive composition viscosity than the prior art method of decreasing the amount of coupled liner polymer. In addition, the asymmetric radial polymers of this invention show reduced solution viscosity over a range of concentrations when compared to linear polymers. This allows for the asymmetric radial polymers of this invention to be formulated into solution based adhesives at much higher concentrations.

We claim:

1. A low viscosity adhesive composition which comprises:

(a) an asymmetric radial block copolymer of a vinyl aromatic hydrocarbon and at least one conjugated diene having from 3 to 6 polymer arms, which:

(i) contains from 40 to 80% by weight of polyvinyl aromatic hydrocarbon block/polydiene block copolymer arms and the balance polydiene homopolymer arms, (ii) has vinyl aromatic hydrocarbon blocks with block molecular weights of from 8000 to 30,000, (iii) has conjugated diene blocks in the copolymer arms with a molecular weight of at least 6000, and (iv) has a polyvinyl aromatic hydrocarbon content of from 10 to 40% by weight; and (b) from 20 to 400 parts per hundred parts of polymer of a tackifying resin.

2. The composition of claim 1 wherein the polymer has, on average, 2 copolymer arms and 1 homopolymer arm.

3. The composition of claim 2 wherein the vinyl aromatic hydrocarbon is styrene and the diene is isoprene or butadiene.

* * * * *